H. M. DYGERT.
Grain-Measure.
No. 224,158. Patented Feb. 3, 1880.
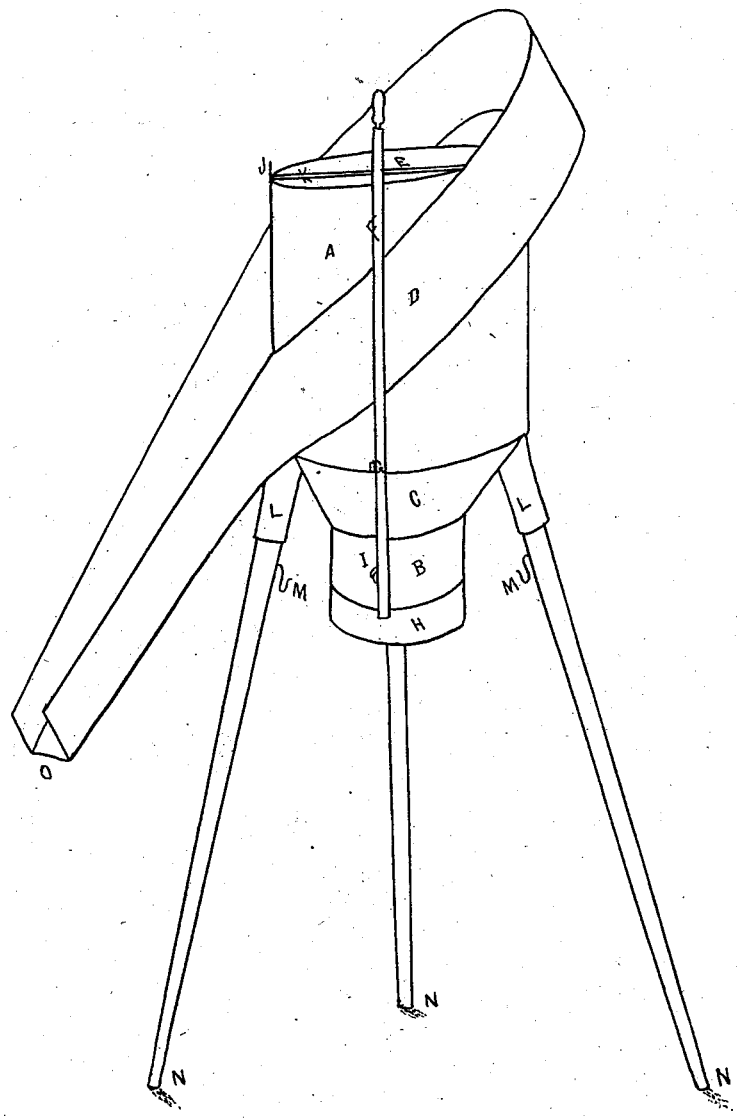
Witnesses,
D. W. Findley.
Thomas McKean.
Inventor
Henry Martin Dygert.

UNITED STATES PATENT OFFICE.

HENRY M. DYGERT, OF PINE TOWNSHIP, MERCER COUNTY, PENNSYLVANIA.

GRAIN-MEASURE.

SPECIFICATION forming part of Letters Patent No. 224,158, dated February 3, 1880.

Application filed October 27, 1879.

*To all whom it may concern:*

Be it known that I, HENRY M. DYGERT, of Pine township, in the county of Mercer and State of Pennsylvania, have invented certain new and useful Improvements in Grain-Measures; and I do hereby declare the following to be a full, clear, and exact description thereof, reference being had to the accompanying drawing, and to the letters of reference marked thereon.

The nature of my invention consists in the construction and arrangement of a grain-measure, as will be hereinafter more fully set forth.

In order to enable others skilled in the art to which my invention appertains to make and use the same, I will now proceed to describe its construction and operation, referring to the annexed drawing, which forms a part of this specification, and which represents a perspective view of my grain-measure.

A represents the vessel or measure, provided with a funnel-shaped bottom, B C, and intended to hold a certain quantity—such as, for instance, half a bushel, or one bushel, &c.

The vessel A is provided with inclined sockets L, in which the legs N are inserted, for supporting the vessel at any suitable height above the floor, and in said legs are fastened hooks M, for attaching the bag to be filled.

On the top of the vessel A is a rod or bar, K, pivoted at one end, J, which is to be moved across the top of the vessel to "stroke-off," all surplus grain being swept into an inclined trough, D, that surrounds the vessel, as shown, and has an outlet at O, where the said surplus grain may be collected in a receptacle placed there for that purpose.

At the bottom of the vessel is a slide or valve, H, connected to an upright lever, F, which is pivoted at G, and has a spring, I, so arranged as to hold said slide or valve closed. The lever extends upward to and above the upper edge of the vessel, so that the operator can easily turn the same to open the slide and allow the measured grain to fall into the bag suspended on the hooks M.

This grain-measure is simple and cheap, and, as shown, combines with it a means for saving any surplus grain that may have been poured into the measure.

Having thus fully described my invention, what I claim as new, and desire to secure by Letters Patent, is—

1. The combination of the vessel A, inclined trough D, and pivoted stroke-off rod K, substantially as and for the purposes herein set forth.

2. The within-described grain-measure, consisting of the vessel A B C, with sockets L and legs N, having hooks M, stroke-off rod K, inclined trough D, and slide or valve H, with lever F, substantially as and for the purposes herein set forth.

HENRY MARTIN DYGERT.

Witnesses:
D. W. FINDLEY,
THOMAS McKEAN,
W. M. DIGHT.